Nov. 8, 1966          J. P. MALEC          3,283,747
                      LIVESTOCK OILER
Filed Sept. 22, 1964                    2 Sheets-Sheet 2
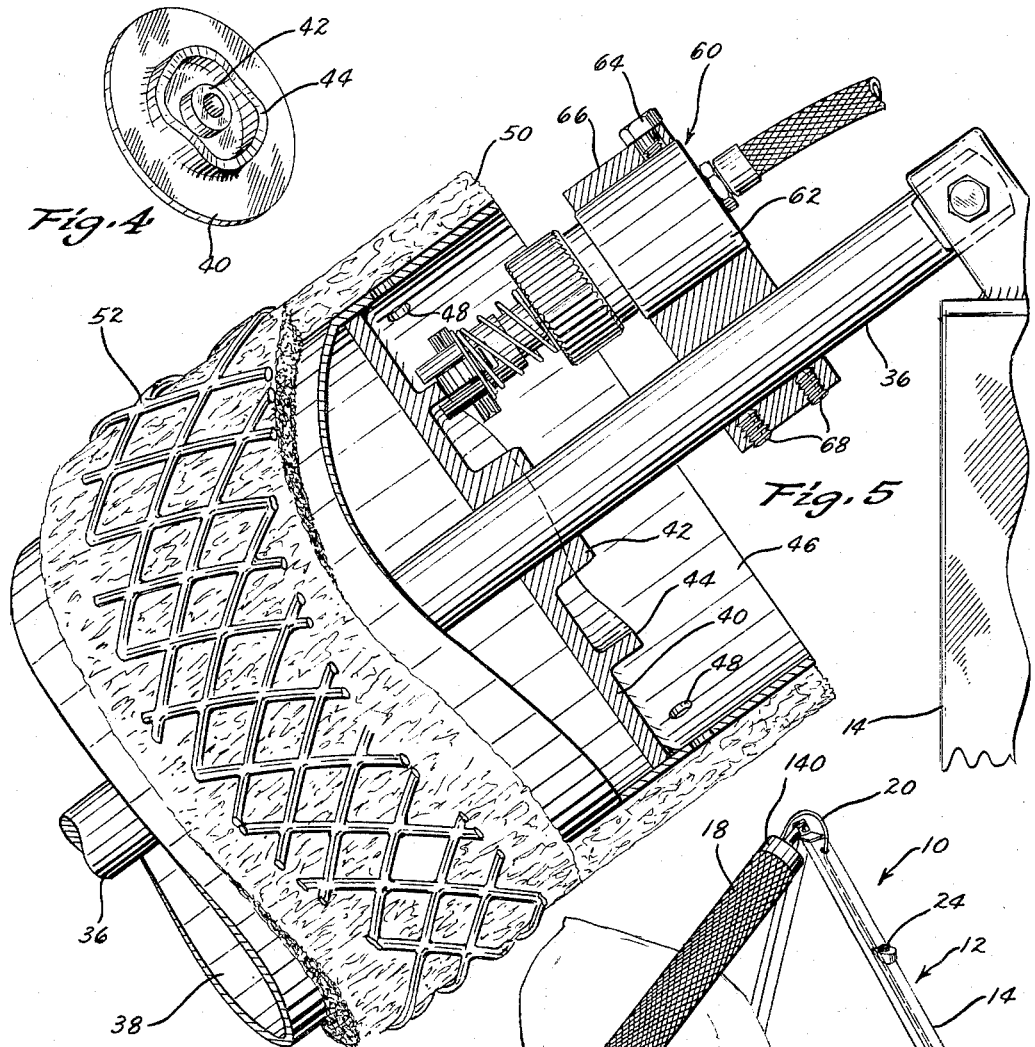
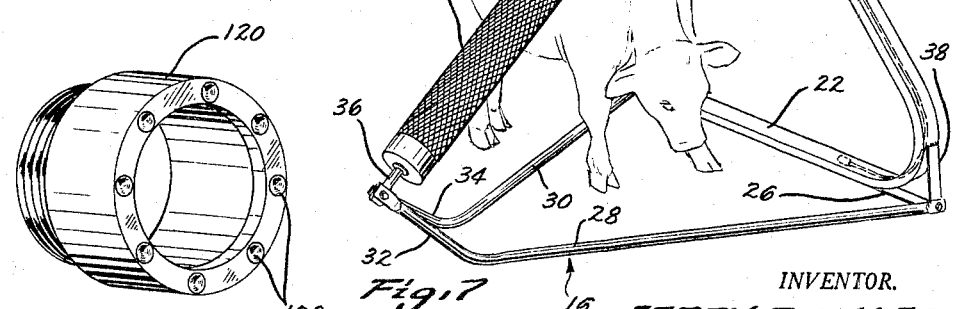
INVENTOR.
JERRY P. MALEC
BY
Dick + Zarley
ATTORNEYS ёunited States Patent Office 3,283,747
Patented Nov. 8, 1966

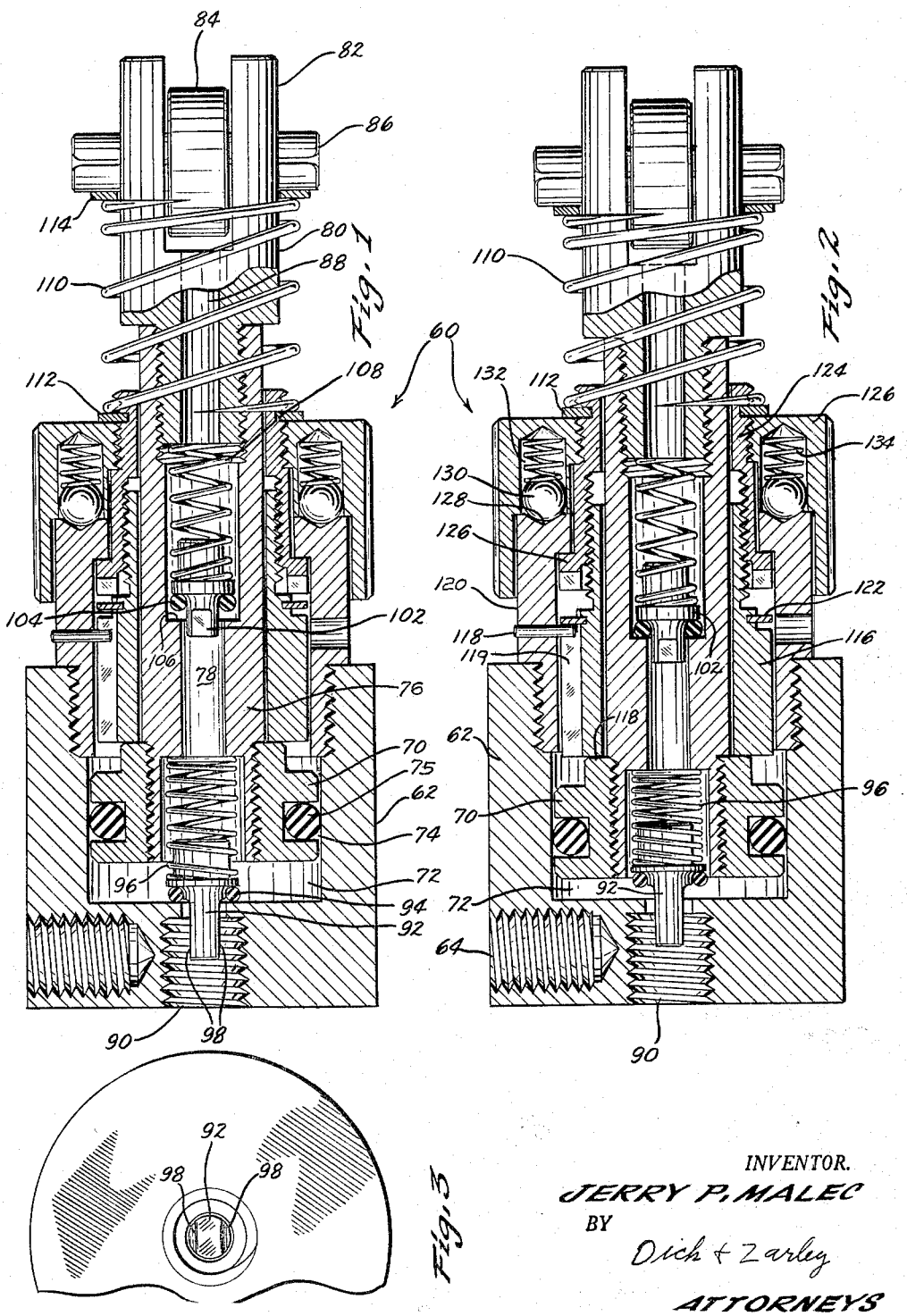

3,283,747
LIVESTOCK OILER
Jerry P. Malec, 2930 N. 84th St., Omaha, Nebr.
Filed Sept. 22, 1964, Ser. No. 398,190
3 Claims. (Cl. 119—157)

This invention relates to animal rubbing and oiling equipment and in particular to an improved cattle oiler.

It is one of the principal objects of this invention to provide an animal rubbing and oiling device wherein a rubbing element is rotated and automatically actuates a fluid or oil injector.

It is a still further object of this invention to provide an elongated rotatable rubbing element in an animal oiler which is mounted on a frame including two triangular shaped members connected at one end with their apexes connected to opposite ends of the elongated rubbing element.

A related object of this invention is to provide a rotatable type cattle oiler wherein the rubbing element extends at an angle to the supporting surface whereby animals of all sizes may operate the oiler by rubbing against the rotatable rubbing element.

A still further object of this invention is to provide an animal rubbing and oiling assembly which is portable and may be easily moved to any desired location.

Another object of this invention is to provide a cattle rubbing and oiling device including a triangular shaped frame having a fluid supply tank contained therein.

A still further object of this invention is to provide a cattle rubbing and oiling device having a hydraulically operated fluid control valve which may be selectively adjusted to vary the stroke of a piston contained therein and thereby control the amount of oil pumped from a fluid supply and available for application to the rubbing element. It is also an object of this valve that the valve-pump draw oil therein upon the piston in the pump moving outwardly therefrom and ejecting oil from the pump as the piston moves inwardly thereof.

A related object of this invention is to provide a cattle rubbing and oiling device having a rotating element and means which is responsive to the rotation of the rubbing element for actuating a fluid valve-pump.

A further object of this invention is to provide a livestock oiler which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a longitudinal cross-sectional view of the valve-pump used in the cattle rubbing and oiling device;

FIG. 2 is a longitudinal cross-sectional view of the pump shown in FIG. 1 but with the components therein moved to other positions;

FIG. 3 is a fragmentary end view of the valve-pump as shown in FIG. 1 as viewed from the left;

FIG. 4 is a perspective view of only the end plate of the rubbing element showing in particular the undulating cam surface;

FIG. 5 is a fragmentary perspective view of the animal rubbing and oiling device in its position of use with a portion of the rubbing assembly broken away to illustrate the construction thereof and its coaction with the valve-pump;

FIG. 6 is a perspective view of an element from the valve-pump of FIGS. 1 and 2; and FIG. 7 is a perspective view of the entire animal rubbing and oiling device shown in its position of use.

The cattle rubbing and oiling device of this invention is referred to generally in FIG. 7 by the reference numeral 10 and is shown to generally comprise a frame 12 of two triangularly shaped assemblies 14 and 16 having their apexes interconnected by rotating rubbing assembly 18. The frame 14 is of a continuous channel-shaped construction and completely open such that animals may walk through it and rub on the side members. The channel-shape of the frame 14 lends itself to being used as a fluid supply tank and thus it is seen that a conduit 20 extends into the tank and terminates in the base portion 22 of the frame 14. An access opening 24 is provided in the frame 14 for filling the fluid tank.

The frame 16 which is connected along its base 26 to the base 22 of the frame 14 is also open since it is constructed from three lengths of tubing 26, 28 and 30. The tubing frame members 28 and 30 are pivotally connected at their ends to the base member 26 and at their opposite ends have upwardly extending portions 32 and 34 which are joined together at their outer ends and are bolted to a shaft 36 which extends through the center of the rubbing assembly 18 and is connected at its upper end between the upstanding frame members of the frame 14. To provide added strength in the frame structure 12, additional plate braces 38 extend between the outer ends of the base members 22 and 26.

The rubbing assembly 18 as best illustrated in FIGS. 4 and 5 includes an elongated steel tube 38 and is rotatably mounted on the stationary shaft 36. An end plate 40 is welded to the interior side wall of the tube 38 at the upper end thereof. The plate 40 is provided with a bearing 42 for engagement with the shaft 36. Also, the end plate 40 is provided with an annular undulating cam surface 44 the purpose of which will be described in greater detail later. The end plate 40 is inwardly offset from the end of the steel tube 38 and thus defines a fluid retaining chamber 46. The side walls of the tube 38 in the chamber 46 are provided with outlet openings 48 which are in communication with a length of continuous absorbent material 50 such as felt burlap pad that acts as a wick and assures uniform distribution of oil over the entire rubbing element with no dripoff. A metal screen 52 cylindrical in cross-section and extending the substantial length of the material 50 and thereby serves to provide a frictional scratching surface for animals to rub against and also hold the absorbent material in place on the tube 38. Also the screen 52 functions to protect the absorbent material 50 from being damaged by the animals rubbing against the rubbing assembly 18.

Since the rubbing assembly 18 extends at an angle to the horizontal as illustrated in FIGS. 5 and 7 the oil in the chamber 46 gravitates to the side wall thereof for passage through the outlet openings 48 as the rubbing assembly 18 is rotated by the animals.

As seen in FIG. 5, a valve-pump is illustrated and generally referred to by reference numeral 60. The pump 60 is provided with a base cylinder 62 which has a transversely extending screw opening (FIG. 2) for receiving a bolt 64 extending through a mounting bracket 66 adjustably mounted on the shaft 36 by a pair of set screws 68.

Referring now to FIGS. 1 and 2 it is seen that the cylinder 62 is provided with a piston 70 which cooperates with the interior side wall of the cylinder 62 to form a chamber 72. The outer peripheral edge of the piston 70 is formed with a groove 74 which receives an O-ring 75 is in mating sealing engagement with the interior side wall of the cylinder 62. A piston rod 76 is threadably connected to the piston 70 and has a passageway 78 extending there through. A piston rod 76 extends outwardly of the valve-pump assembly 60 and is threadably connected to a member 80 which has a clevis portion 82 in rotatable engagement with a roller 84 mounted on a pin 86. The passageway 78 is in direct alignment with the roller 84 through a passageway 88 in the member 80 which is in communication with the passageway 78.

Referring now again to the cylinder 62 it is seen that an inlet opening 90 is formed in the base end thereof and is in direct line communication with the passageway 78 in the piston rod 76. A closure element 92 is loosely mounted in the inlet opening 90 and bears against an O-ring 94 for closing the inlet opening 90. A coil spring 96 extends longitudinally of the piston 70 and embraces the upper end of the closure element 92 and serves to yieldingly hold the O-ring 94 in sealing engagement with the bottom end of the chamber 72. As seen in FIG. 3 particularly, the closure element 92 has similar flat surfaces 98 on opposite sides around which fluid may pass when the closure element has moved out of sealing engagement with the outlet opening 90 as shown in FIG. 2. The portion of the closure element 92 extending into the outlet opening 90 serves to maintain the element in position for closing the conduit 90.

In vertical alignment with the closure element 92 is a second closure element 102 constructed similarly to the element 92 and having an O-ring 104 for sealing engagement with a shoulder 106 in the piston rod 76. A spring 108 yieldingly holds the closure element 102 in its closed position as illustrated in FIG. 2. The upper end of the spring 108 bears against the lower threaded end of the member 80.

From the description thus far of the valve-pump 60 its operation can be understood. The roller 80 is in continuous mating contact with the undulating cam surface 44 on the end plate 40 as illustrated in FIG. 5 and thus the piston 70 is moved back and forth or up and down relative to the inlet opening 90 in the cylinder 62. In FIG. 1 the piston 70 is shown moved to its upper position with the closure element 92 closing the inlet opening 90; however the accumulated pressure within the chamber 72 has overcome the pressure of the spring 108 against the closure element 102 and thus in FIG. 1 this closure element 102 is shown in its open position such that oil may flow thereby and into the chamber 46 (FIG. 5).

In FIG. 2, a piston 70 is seen in its lower position starting to move upwardly and thereby causing a negative pressure in the chamber 72 which is opposed by external oil and air pressure through the inlet opening 90 which overcomes the pressure of the spring 96 to permit the closure element 92 to move to its open position. At the same time, the closure element 102 has returned to its closed position. Thus it is seen that as the piston 70 moves toward the inlet opening 90 fluid in the chamber 72 and passageway 78 is ejected pass the closure element 102 against the pressure of the spring 108 and thence into the retaining chamber 46. On the other hand, when the piston 70 is moving away from the inlet opening 90, the closure element 92 is drawn open against the pressure of the spring 96 and the second closure element 102 in the piston rod 76 is closed.

The reciprocation of the piston rod 76 connected to the piston 70 is opposed by a large spring 110 embracing the member 80 and in bearing engagement with lock washers 112 and 114 at opposite ends thereof. The remainder of the structure illustrated in FIGS. 1 and 2 is for the purpose of adjusting the length of the stroke of the piston 70 and thus control the amount of fluid passing through the valve-pump 60. A sleeve element 116 slidably embraces the piston rod 76 but bears at its lower end against a shoulder 118 on the piston 70 and thereby limits the upward movement of the piston. A vertical slot 119 is formed in the outer cylindrical surface of the sleeve 116 and receives a pin 118 mounted in the side wall of a sleeve member 120 threadably secured to the cylinder 62. A locking washer 122 is connected to the outer cylindrical surface of the sleeve 116 and limits its downward movement thereof and thereby serves to limit the extent to which the stroke of the piston 70 can be shortened. Next, a sleeve 124 is threadably engaging the upper end of the sleeve 116 and is adapted to be extended or retracted by moving the sleeve 116 longitudinally of the valve-pump 60. It is noted that the pin 118 prevents rotation of the sleeve 116 as it moves longitudinally by the rotation of the sleeve 124. Sleeve 124 is threadably connected to a hand engaging collar 126 which embraces the sleeve 120. It is also noted that the lower peripheral edge of the sleeve 124 is formed with an annular shoulder 126 in engagement with a corresponding shoulder formed on the sleeve 120. A plurality of recesses 128 are formed in the top end surface of the sleeve 120 for receiving ball detents 130 carried in bores 132 formed in the collar 126. Detent springs 134 are held in the bores 132 and bear against the balls 130 to hold them in the recesses 128. Thus it is seen that the collar 126 is locked between the lock washer 112 on the sleeve 124 and is further held against outer longitudinal movement by the interlocking annular shoulders 126 and 128 on the sleeves 124 and 120 respectively. Thus as the collar 126 is manually rotated, the sleeve 116 is moved longitudinally towards and away from the piston 70 thereby setting the limits for its stroke. The setting of the collar 126 in FIG. 1 will permit a long stroke while in FIG. 2 the piston stroke is relatively shorter.

Thus it is seen that a simplified automatic animal rubbing and oiling device has been provided in this invention. By the animals rubbing against the rubbing assembly 18 oil is automatically pumped into the retaining chamber 46 and available for passage through the openings 48 onto the absorbent pad 50 where the pad 50 serves as a wick to distribute it along the length of the rubbing assembly 18. Enough oil can be stored within the tank in the frame 14 to serve a full season of use; therefore the device may go unattended for a long period of time. Depending on the amount of oil desired in the wick material 50, the valve-pump 60 will be adjusted as above described to control the flow of fluid therethrough. The rubbing and oiling device 10 is completely portable and may be moved to any desired location and by its triangular frame construction is completely stable and at the same time presents many rubbing edges other than the rubbing assembly 18 for animals to scratch against. The animals may walk through the frame 14 and rub against the upstanding frame portions. Also, all animals may be accommodated by the rubbing portions of the unit 10 since the rubbing assembly 18 and the upstanding portions of the frame 14 are disposed at an angle to the horizontal and thereby provide a rubbing surface for all sized animals.

It is to be further noted in FIG. 7 that a weather cap 140 is provided over the end of the rubbing assembly 18 and thereby covers the retaining chamber 46 to prevent rain or the like from mixing with the insecticide or oil being used. The cap 140 as illustrated will meet at its lower edge with the upper peripheral edge of the screen 52.

I claim:
1. A livestock oiler, comprising,
a ground engaging frame,
an upstanding frame secured to said ground engaging frame,
a rubbing assembly extending between the outer end of said ground engaging frame and the upper end of said upstanding frame,
said rubbing assembly including an elongated member rotatable about an axis extending between the outer end of said ground engaging frame and the upper end of said upstanding frame,
liquid absorbent means embracing said elongated member along its length,
a fluid supply, a passageway communicating between said fluid supply and said absorbent means, a valve in said passageway and having a cylinder, a piston movable in said cylinder, the inner end of said piston and said cylinder forming a chamber, an inlet in communication with said chamber and connected by a conduit to said passageway in communication with said absorbent means, and a closure means in said inlet responsive to the movement of said piston, said closure means opening upon said piston moving away from said inlet and thereby enlarging said chamber and said closure means closing said passageway upon said piston moving towards said inlet, closure means in said passageway, a spring means for yieldingly holding said closure means in a closed position, said piston upon moving towards said inlet increasing the pressure in said passageway against said closure means to overcome the pressure of said spring means and open said closure means for fluid to move out said outlet, and means responsive to the rotation of said elongated member to actuate said valve for dispensing fluid from said outlet, said valve having one end in the upper end of said elongated member and said means responsive to rotation of said member being a conduit portion in said passageway.

2. The structure of claim 1 wherein a spring means yieldingly maintains said closure means in said inlet in a closed condition, said closure means opening upon pressure in said inlet overcoming the pressure of said spring means as said piston is moved away from said inlet.

3. A valve for a livestock oiler, comprising, a cylinder having a chamber and a piston movable in said chamber, said chamber having an inlet, said piston having a passageway extending therethrough longitudinally and adapted to be in communication with said inlet, a pair of closure elements positioned in opposite ends of said piston passageway, a spring engaging one of said closure elements for yieldingly closing said chamber inlet, a second spring engaging the other of said closure elements for yieldingly closing said piston passageway, said piston upon moving towards said chamber inlet increasing pressure in said piston passageway against said other closure element to overcome the pressure of said spring and open the passageway to the flow of fluid out of said passageway from said chamber, and said piston upon moving away from said inlet adapted to permit said one closure element to move to an open position under negative pressure of said piston.

References Cited by the Examiner
UNITED STATES PATENTS

| | | | |
|---|---|---|---|
| 1,390,611 | 9/1921 | Haisley | 119—157 |
| 3,038,445 | 6/1962 | Fleming | 119—157 |
| 3,156,216 | 11/1964 | Poage | 119—157 |

SAMUEL KOREN, *Primary Examiner.*

HUGH R. CHAMBLEE, *Examiner.*